United States Patent [19]
Scheidel et al.

[11] 3,809,151
[45] May 7, 1974

[54] AIR HEATING AND COOLING SYSTEM FOR A VEHICLE PASSENGER COMPARTMENT

[75] Inventors: Wolfgang Scheidel, Buhlertal; Helmut Steinmann, Baden-Baden, both of Germany

[73] Assignee: Robert Bosch GmbH, Stuttgart, Germany

[22] Filed: Mar. 7, 1973

[21] Appl. No.: 338,745

[30] Foreign Application Priority Data
Mar. 8, 1972 Germany.......................... 2211091

[52] U.S. Cl.................... 165/42, 98/2.06, 62/244
[51] Int. Cl.............................................. B60h 3/00
[58] Field of Search............... 98/2.01, 2.05, 2.11; 62/243, 244; 165/23, 42, 43, 44

[56] References Cited
UNITED STATES PATENTS

| | | |
|---|---|---|
| 2,865,610 | 12/1958 | Sparrow............................ 165/26 |
| 2,860,567 | 11/1958 | Wilfert............................... 98/2.06 |
| 2,729,158 | 1/1956 | Wilfert............................... 98/2.06 |
| 2,718,839 | 9/1955 | Wilfert............................... 98/2.06 |

*Primary Examiner*—Meyer Perlin
*Attorney, Agent, or Firm*—William R. Woodward

[57] ABSTRACT

The output of a blower is supplied to three branch ducts in one of which the air passes through a cooler, in another of which it passes through a heater and in the third of which the air always passes through unchanged. A common control valve controls the discharge from the three ducts, never allowing discharge from more than two of them and providing smooth transition as the valve is moved from one extreme position to the other, from 100 percent heated air to 100 percent unchanged air to 100 percent cooled air. For reasons of heat exchanger design, the air passing through the duct in which the heater is located is branched off downstream of the cooling device from the duct in which the cooler is located.

16 Claims, 11 Drawing Figures ns of an air heating and cooling system with a different type of control valve.

AIR HEATING AND COOLING SYSTEM FOR A VEHICLE PASSENGER COMPARTMENT

This invention relates to an air heating and cooling system for motor vehicles and more particularly to a system in which at least one cooling and at least one heating device, in each case preferably heat exchangers, are associated with parallel connected ducts of an air duct system through which air is supplied to the passenger compartment of the vehicle at a temperature regulated by a control device that suitably mixes the air flowing through the parallel ducts.

Air heating and cooling systems for vehicles are known in which air supplied by a blower is apportioned by a mixing valve to two parallel ducts, in one of which is located a heating device and in the other a cooling device, the apportionment being controlled in response to the temperature of the air supplied to the passenger compartment. In this known type of heating and cooling system, warmed air is delivered exclusively to an orifice in the foot space of the vehicle, while cooled air is led to special discharge openings in the dashboard of the vehicle.

Another kind of air heating and cooling system is known in which the air supplied by the blower is first passed through a cooler and then through a heater and only thereafter distributed to the various ducts leading to the individual air discharge openings in the passenger space of the vehicle. The temperature of the air reaching the vehicle interior in this system is controlled by valves which regulate the operation of the heater or the cooler, as the case may be.

Still another type of air heating and cooling system for vehicles is known in which the air supplied by the blower is first passed through a cooler and then distributed to two air ducts. A heat exchanger serving as a heater is associated with one of these two parallel air ducts. In this case the temperature of the air delivered to the passenger compartment is controlled by a mixing valve which varies the proportion of air flowing through the parallel ducts.

In all of these known vehicle air heating and cooling systems, the disadvantage has resulted that when the outer air temperature lies in the range between about +10 to about +30°C, hence during the larger portion of the year, both the heating and cooling devices must be turned on. It is an object of the present invention to provide an air heating and cooling system in which this disadvantage is overcome. The system is intended to be so constructed that regulation can be performed with simple means.

SUBJECT MATTER OF THE PRESENT INVENTION

Briefly, air is supplied to three branch air ducts, in one of which the air may be heated, in a second of which it may be cooled and in the third of which the air temperature is not changed. A control device is provided for mixing the air supplied by these three ducts for delivery to the passenger space; and in accordance with a particularly advantageous form of the invention, the mixing is applied to the output of only two of the three ducts at the same time, in each case mixing two air streams of different temperatures, one of these two air streams always being the stream of which the temperature is not changed.

In a preferred form of the invention the control device is a slide or gate valve, such as a rotary slide valve with fixed and movable apertures by which the rate of discharge of air from the respective aforesaid branch ducts to the passenger space of the vehicle can be controlled. In another preferred form of the invention, the control device includes a cylinder valve with a diametral passage.

The invention will be described by way of example with reference to the accompanying drawings, wherein.

Figure 1:
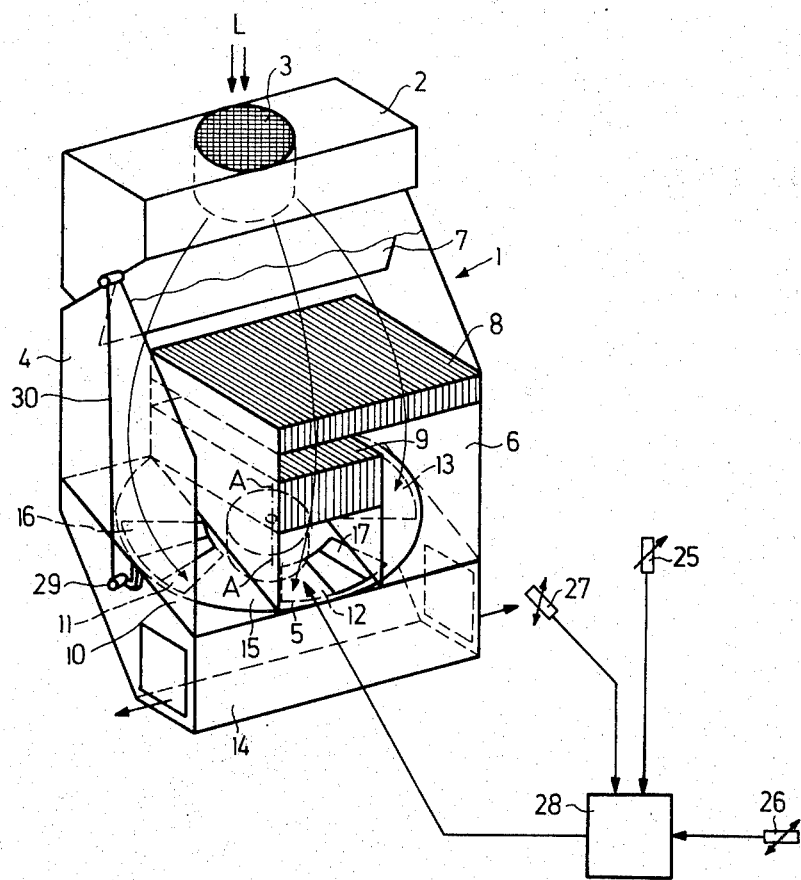
FIG. 1 is a perspective view, with certain elements shown in diagram, of an air heating and cooling system in accordance with the invention.

The air heating and cooling system shown in FIG. 1 has the elements to which this invention particularly relates located in a housing 1, into which air drawn from outside the vehicle flows in at the location and direction indicated by the arrow L. The air duct system inside the housing 1 includes a main duct 2 in which a blower 3 is located. The air flowing through the main duct 2 is distributed to three ducts 4, 5 and 6 disposed parallel and adjacent to each other. A flap valve 7 in the main duct 2 near where it feeds the branch ducts 4, 5 and 6 is provided in order to control the overall rate of air movement in the system.

Outside air flows through the duct 4, which is at the left in FIG. 1, without its temperature being changed. A heat exchanger 8, which may for example be the evaporator of a cooling system serves as a cooler by which the air flowing in duct 6 may be cooled. In the duct 5, which is the central one of the three parallel ducts as shown in FIG. 1, a heat exchanger 9 serving as a heater is provided. When the evaporator 8 is turned on, air flowing through the duct 6 comes out at a temperature lower than that of the outside air. When the heater 9 is turned on, air flowing through the duct 5 comes out warmer than the outside air.

The three parallel ducts 4, 5 and 6 are closed off at the bottom by a partition 10 in which three apertures 11, 12 and 13 are provided arranged in the form of segments cut out of an annular area of the partition 10 defined by two concentric circles. These apertures provide the respective discharge openings of the three ducts 4, 5 and 6. A slide valve 15 of the rotary disc type is mounted by a suitably bearing on the partition 10 so as to be rotatable about the axis A—A. This rotary slide valve 15 has two apertures 16 and 17 corresponding in shape to that of the discharge openings 11, 12 and 13 of the air ducts 4, 5 and 6.

In the embodiment of the invention illustrated in FIG. 1, the cut-outs acting as discharge openings for the parallel ducts are successively spaced (between centers) by 90° with reference to the pivot of the rotary slide valve 15. The magnitude of these openings is exactly so chosen that the shape of the surface between two successive duct discharge openings has the same shape as that of the cut-out openings. The two apertures 16 and 17 in the disc of the rotary slide valve 15 are so spaced circumferentially that one duct is fully opened by one of these apertures when the other one lies exactly between the openings of the other two ducts.

Figures 2A, 2B, 2C, 2D, 2E:
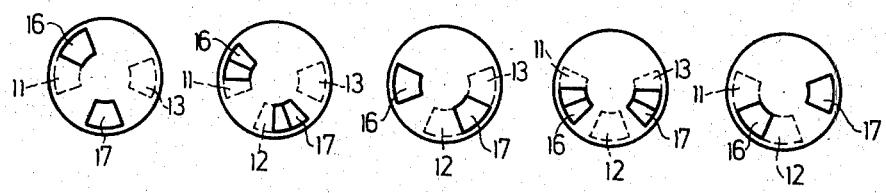
FIG. 2 shows diagrammatic representations of the position of the control valve of the system under different conditions of operation.

In FIGS. 2a, 2b . . . 2e diagrammatic plan view of the rotary slide valve 15 for different switching positions are shown. The annular segments shown in dashed lines represent the openings 11, 12 and 13 in the horizontal partition 10. The annular segments drawn in solid lines represent the apertures 16 and 17 in the disc of the rotary slide valve 15.

FIG. 2a shows a position of the rotary slide valve in which the aperture 17 of the disc registers with the discharge opening 12 of the air duct 5, through which warmed air flows. In this case this warmed air can flow in the air duct 14, whence it is distributed, by means not shown in the drawing, to the individual air discharge openings in the passenger compartment of the vehicle. At this time the other two duct discharge openings 11 and 13, however, are sealed shut. For this position of the slide valve, accordingly, only warm air is delivered by the system to the passenger compartment.

In FIG. 2b the rotary slide valve 15 is shown in a position in which the apertures 16 and 17 partly register with the discharge openings 11 and 12 respectively of the partition 10. In this condition of the system the outside air, on the one hand, and warmed air, on the other, are supplied to the air duct 14, where these two air streams are mixed. The air flowing into the passenger compartment is therefore cooler than in the condition of the system shown in FIG. 2a.

In the situation shown in FIG. 2c only the air duct 4 is opened, since the aperture 16 registers with the discharge opening 11 of that duct, so that only outside air can flow in the duct 14 and from there into the passenger compartment.

In the situation shown in FIG. 2d the apertures 16 and 17 lie partly in registry with the discharge openings 11 and 13 respectively, of the horizontal partition 10. Accordingly outside air, on the one hand, and air cooled by the evaporator 8, on the other hand, flow into the passenger compartment of the vehicle.

In the condition of the system shown in FIG. 2e, however, only air duct 6 is opened, so that only cooled air can flow into the passenger compartment.

It will thus be seen that a rotation of the rotary slide valve in a counter clockwise direction, beginning from the position shown in FIG. 2a, the air delivered to the passenger compartment of the vehicle becomes steadily cooler, this effect being provided by the progressive closing and opening of the air ducts 5, 4 and 6 (in that order) by the rotary valve 15, in such a way that the next in sequence is progressively opened as the one previously opened is progressively closed. In other words, the output of duct 4 is regulated with respect to the output of either duct 5 or duct 6 in an inversely proportional manner.

Figure 3A:
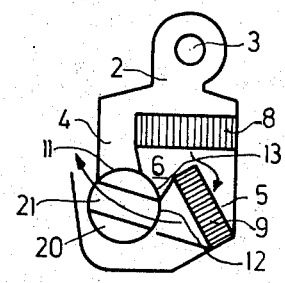
FIG. 3 shows diagrammatically different mixing positions of an air heating and cooling system with a different type of control valve.
Figure 3B:
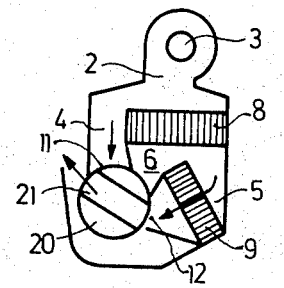

Another illustrative embodiment of the invention in an air heating and cooling system is shown in FIG. 3, where FIGS. 3a, 3b . . . 3e diagrammatically show different conditions of the system. Here again there is a main duct 2 in which air flow is produced by a blower 3. The main duct 2 branches, again, into three ducts 4, 5 and 6. The arrangement this time is not geometrically parallel, but from a system point of view the ducts may be regarded as in principal parallel. That is, they are supplied "in parallel" and they discharge, except for interruption by valving, "in parallel," from the point of view of an air flow circuit. In this case the discharge openings 11, 12 and 13 of the three air ducts 4, 5 and 6 are immediately adjacent to each other and the discharge portion of these ducts converge in such a manner that a valve cylinder 20, provided with a diametral passage 21, may serve as the control device of the system. The passage 21 has a rectangular cross section the dimensions of which approximately correspond to the substantially identical cross sections of the discharge openings of the three air ducts 4, 5 and 5.

Corresponding reference numerals are used in FIG. 3 and FIG. 2 for the ducts 4, 5 and 6 and for the discharge openings 11, 12 and 13, as well as for the cooler 8 and the heater 9. It will therefore be seen that the condition of the system represented in FIG. 3a corresponds to that shown for the other embodiment in FIG. 2a and the same applies for FIGS. 3b and 2b, FIGS. 3c and 2c, FIGS. 3d and 2d and FIGS. 3e and 2e.

Figure 3C:
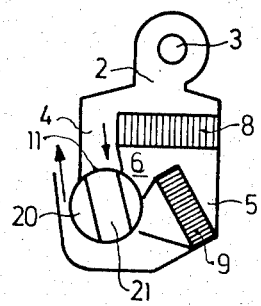
Figure 3D:
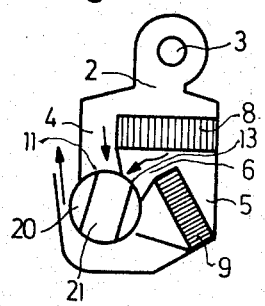
Figure 3E:
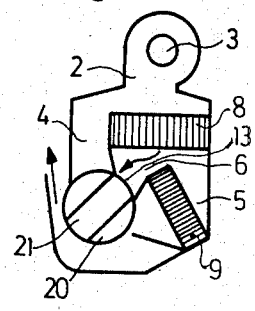

It may accordingly be seen from the positions of the cylinder 20 in FIGS. 3a, 3b . . . 3e, that in this system also the air supplied to the passenger compartment can be gradually changed from hot to cold when the cylinder is turned, clockwise beginning from the position shown in FIG. 3a. In the situation shown in FIG. 3 only air warmed by the heating element 9 is delivered to the passenger compartment, whereas under the conditions illustrated in FIG. 3b both warm air and unheated outside air can flow into the passenger space. In the case of FIG. 3c, only unchanged outside air flows into the car interior, while in the situation shown in FIG. 3d, in part cooled air and in part unaffected outside air are supplied. Finally, in the situation shown in FIG. 3e, only cooled air is supplied by the system to the passenger compartment. The individual air streams in use in the various cases are indicated in the diagrams of FIG. 3 by arrows.

Both of the described embodiments of the invention are particularly effective as fully regulated heating and cooling systems. In a fully regulated air control system the air delivery temperature should depend as linearly as possible on the control valve position, a condition that can be accomplished in the case of the two described control devices very easily by modifying the shape of the apertures 16 and 17 in the disc of the rotary gate valve 15 or by modifying the shape or dimensions of the passage 21 of the valve cylinder 20. By rotation of the rotary slide valve 15 or of the valve cylinder 20, as the case may be, the air delivery temperature can accordingly be continuously changed from cooling to heating over the whole range of movement of the control device, an effect that is not so easy to realize, as has heretofore been appreciated, with a variety of conventional valve arrangements.

In the air heating and cooling systems here described, as is particularly clear from FIGS. 2 and 3, there are never more than two air streams mixed with each other, and one of them is always the air stream the temperature of which is that of the outside air. In systems of this sort, therefore, only one of the two heat exchangers needs to be used at any one time.

The rotary slide valve 15 or the valve cylinder 20, as the case may be, serving as the control device of the system is preferably driven by an electric motor (not shown). It is, however possible, to provide manual control with a flexible cable linkage or a rack and pinion linkage, or a control utilizing a vacuum box or a device using an expansible material.

In the case of an air heating and cooling system having still further control devices affecting the temperature or the rate of flow of the air stream delivered to the passenger compartment, as for example a stepwise ventilator control and/or a valve for selecting between closed circulation of air and fresh air input, usually with possibility of adjusting the proportion of fresh air input, all involved in the regulation task, it is advantageous to constitute the regulation system in such a manner that the regulating device merely affects the positioning of the rotary slide valve 15 or the valve cylinder 20, as the case may be, while all the other control devices above mentioned are actuated in accordance with the position of the rotary slide valve 15 or the cylinder valve 20 by means of cable actuators or similar arrangements. That is possible in the case of systems of the present invention because of the fact that the control device is so constituted that for every temperature setting for the air flowing into the passenger compartment there is an exactly defined position of the control device distinguishable from all other possible positions that it may have. In previously known systems control devices of flap valve form that was not possible because a particular air delivery temperature could be equally well provided by two or more settings of the flap valve.

By way of example there is shown in FIG. 1 an electronic regulating system comprising a manual setting device 25 for providing a desired temperature setting, a temperature sensor 26 for measuring the temperature of the passenger compartment, a temperature sensor 27 for measuring the temperature of the air delivered by the system and a regulator apparatus 28. The regulator 28 controls the position of the rotary slide valve 15 as a function of the measured and prescribed magnitudes. The disc of the rotary slide valve 15 has a drive stud 29 which actuates the air intake flap valve 7 by means of a cable connection 30. The actuating stud 29 can also be arranged to control the valves of the heat exchangers and, if desired, also air distribution valves. The regulator 28 is concerned, therefore, only for the proper setting of the rotary slide valve and all the other control devices of the air heating and cooling system are controlled in accordance with the position of the rotary slide valve 15.

The air heating and cooling system of the present invention is relatively simple to build and very easy to regulate. It has a very high reliability in operation, moreover, since for the output temperature adjustment, instead of a number of valves, only one movable part, i.e., a rotary slide valve or a cylinder valve, is provided.

It will be noted that as shown both in FIG. 1 and in FIG. 3, the air passing through duct 5 and hence also through the heater 9 also passes through the cooler 8, which of course is inactive when the heater 9 is operating. In other words the duct 5 is branched off from the duct 6 downstream of the cooler 8. This slight deviation from ordinary parallel branching of the three ducts makes it possible to provide the cooling heat exchanger surface in a form offering relatively little resistance to the passage of air while still maintaining a highly compact housing 1. Since a higher temperature difference is readily available for heating, the heat exchanger used as a heater can have longer passages and smaller cross section and the reduced flow of hot air as compared to the flow of cool air does not prevent reaching a sufficiently high heating capacity. It is to be understood that the references herein to "parallel" ducts are meant in a very broad sense. It is clear that in any event the two ducts through which at any one time air is concurrently flowing are being fed and discharged in parallel.

In the embodiments of the invention above described three parallel brand ducts are provided, one equipped with a heater, one with a cooler and another with no heat exchanger of either type. The mixing valve is shown so arranged that air from either the heating branch 5 or the cooling branch 6 is either used along or is mixed in some proportion with air from the unchanged air duct 4. It will be seen, however, that the principle of the invention is not limited to these valving schemes, nor to the mixing of air flows from only two ducts at a time. The third duct has its heat exchanger shut off in each case, so that it can perfectly well function as part, or even all, of the passage for unchanged air, if the valving program is modified accordingly. For example, when the heating element 9 is turned off cooled air from the duct 6 can be mixed with unchanged air from either or both of ducts 4 and 5, whereas when the cooler 8 is turned off the heated air from the duct 5 can be mixed with unchanged air from either or both of ducts 4 and 6. The presence of the duct 4 is thus not strictly necessary for the practice of the invention, but it is a practical convenience because of its low flow resistance that permits a relatively large volume of air to be moved easily through a physically small structure when a small heating or cooling effect under close control is desired.

Although the invention has been described with respect to two particular embodiments, it will be understood that variations and modifications are possible within the inventive concept without departing from the spirit of the invention.

We claim:

1. An air heating and cooling system for the passenger compartment of a motor vehicle comprising:

first, second and third ducts (4, 5 and 6) arranged to be supplied with air from a common air supply and adapted to guide the flow of air streams branching from said air supply;

heating means for heating air passing through said first duct (6);

cooling means for cooling air passing through said second duct (5);

said third duct (4) being adapted to transmit air without change of temperature, and temperature responsive means for selecting for delivery to said passenger compartment a flow of air exiting from said first, said second or said third duct alone or from any combination thereof.

2. An air heating and cooling system as defined in claim 1 in which said temperature responsive means (15, 20) is arranged to provide for mixing air only two of said air streams at a time and in each case air from said third duct (4) is caused to pass by said temperature responsive means.

3. An air heating and cooling system as defined in claim 2 in which said temperature responsive means includes a gate valve (15) by which the proportion of air from said first, second and third ducts (4, 5 and 6) supplied to said passenger compartment is controllable.

4. An air heating and cooling system as defined in claim 3 in which said gate valve (15) is adapted to shut down or open up said ducts (4, 5 and 6) two at a time in inversely proportional fashion.

5. An air heating and cooling system as defined in claim 4 in which the discharge openings (11, 12 and 13), respectively provided for said ducts, are arranged in an equally spaced series and in which said gate valve (15) is provided with a slide having two apertures (16, 17) the spacing between which is greater than the spacing of two adjacent discharge openings of said respective ducts (4, 5 and 6).

6. An air heating and cooling system as defined in claim 5 in which the shape of said duct discharge openings (11, 12 and 13) is similar to the shape of said apertures (16, 17) in said slide of said gate valve (15).

7. An air heating and cooling system as defined in claim 6 in which the shape of the surface between said discharge openings (11, 12) of two of said ducts (4, 5) have the same shape as one of said duct discharge openings.

8. An air heating and cooling system as defined in claim 7 in which said slide of said gate valve (15) has two apertures (16, 17) so spaced from each other that one of said ducts (4) is opened by one of said apertures (16) when the other of said apertures (17) said slide of said gate valve (15) lies exactly between the openings (12, 13) of the other two of said ducts (5, 6).

9. An air heating and cooling system as defined in claim 5 in which said temperature responsive means includes a rotary slide gate valve (15).

10. An air heating and cooling system as defined in claim 9 in which said discharge openings (11, 12 and 13) of said three ducts (4, 5 and 6) are disposed on said slide of said rotary slide gate valve (15) with the centers of adjacent openings relatively displaced by 90° with reference to the axis of rotation (A—A) of said rotary slide.

11. An air heating and cooling system as defined in claim 10 in which said discharge openings (11, 12 and 13) of said three ducts (4, 5 and 6) have the shape of segments of a circular annulus.

12. An air heating and cooling system as defined in claim 2 in which discharge openings (11, 12 and 13) are provided for said three ducts (4, 5 and 6) immediately adjacent to each other and in which said temperature responsive means includes a valve cylinder (20) with a diametral passage (21).

13. An air heating and cooling system as defined in claim 12 in which the respective cross sections of said discharge openings (11, 12 and 13) of said three ducts (4, 5 and 6) are at least approximately of the same magnitude and at least approximately correspond in shape to the cross section of said passage (21) through said valve cylinder (20).

14. An air heating and cooling system as defined in claim 13 in which said passage (21) through said valve cylinder (20) has a rectangular cross section.

15. An air heating and cooling system as defined in claim 1 in which the movement of said temperature responsive means is adapted to change the temperature of the delivered air continuously between a minimum and a maximum value.

16. An air heating and cooling system for the passenger compartment of a motor vehicle comprising:
a plurality of ducts, including a first duct (5) equipped with air heating means (9), a second duct (6) equipped with air cooling means (8), and a third duct (4) having no air heating or cooling means provided therein, said ducts being arranged to be supplied with air from a common air supply;

means for selectively enabling or disabling said heating and cooling means respectively according to whether heating or cooling is desired, and
temperature responsive means for selecting a flow of air exiting from one or more of said plurality of ducts for delivery to said passenger compartment in such a way as to tend to maintain a desired temperature in said passenger compartment.

* * * * *